UNITED STATES PATENT OFFICE.

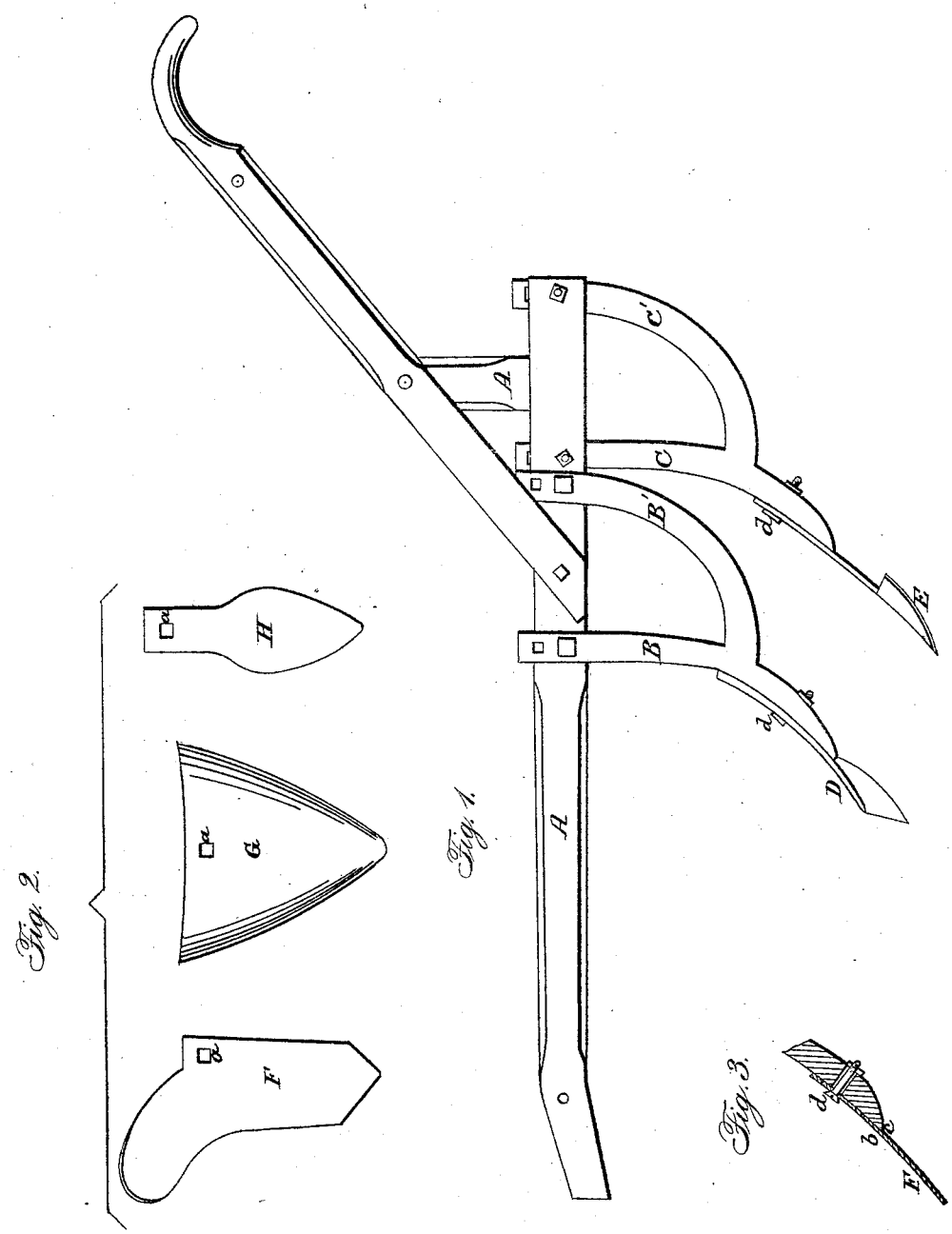

JIMPSY B. NETHERLAND, OF LOUISVILLE, GEORGIA.

IMPROVEMENT IN CULTIVATORS.

Specification forming part of Letters Patent No. 27,376, dated March 6, 1860.

*To all whom it may concern:*

Be it known that I, JIMPSY B. NETHERLAND, of near Louisville, in the county of Jefferson and State of Georgia, have invented an Improved Plow; and I do hereby declare the following to be a correct description of the same, reference being had to the accompanying drawings, in which—

Figure 1 is a side elevation of my improved plow; Fig. 2 shows various blades that may be attached to it, and Fig. 3 shows the arrangement for attaching the blades or shovels.

The nature of my invention consists in the peculiar construction and arrangement of the plow hereinafter set forth.

My plow is intended to be used in the cultivation of corn or cotton, and operates simultaneously as a surface and subsoil plow, either simply stirring and turning the subsoil and surface or reversing their positions according to the shape, position, and set of the shovels or blades employed.

To enable others to make and use my improved plow, I will proceed to describe its construction and operation with reference to the drawings, in which the same letter is used to mark the same part wherever it occurs.

The stock A and handles are of the usual construction.

To the stock are attached by bolts, as shown, two curved and branched standards, B and C, having curved arms or branches B' C'. The lower extremities of the standards have points which enter recesses of corresponding size and shape in the rear sides of the shovels or plows, which are attached to them. The upper extremities of the standards are provided with two or more bolt-holes for the purpose of adjusting their position according to the character of the work to be done. Each shovel or blade has a bolt-hole, $a$, and a recess, $b$, for the reception of the point $c$ of the standard. The blade is attached to the standard by inserting the point of the standard into the recess in the blade and then passing a bolt through both blade and standard and securing it by a nut, as clearly shown in sectional view in Fig. 3. This simple and ready mode of attachment renders easy a change of blades at any time that it may be required.

The standard C is placed in rear of the standard B, and has the subsoil plow or blade attached to it.

The advantages of this plow are simplicity of construction, ready removal and renewal of parts, adjustability, and durability.

What I claim, and desire to secure by Letters Patent, is—

The arrangement of the peculiarly-shaped branched standards B C, constructed as described, in combination with blades or shovels constructed as described, and attached to the standards in the manner specified.

The above specification signed and witnessed this 20th day of January, A. D. 1860.

JIMPSY B. NETHERLAND.

Witnesses:
EDM. F. BROWN,
CHAS. F. STANSBURY.